(12) United States Patent
White et al.

(10) Patent No.: US 8,155,876 B2
(45) Date of Patent: Apr. 10, 2012

(54) SYSTEMS AND METHODS FOR CONTROLLING AIRCRAFT ELECTRICAL POWER

(75) Inventors: Jeffrey J. White, Shoreline, WA (US); David K. Toy, Marysville, WA (US); J. Everett Groat, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1540 days.

(21) Appl. No.: 11/518,379

(22) Filed: Sep. 7, 2006

(65) Prior Publication Data
US 2009/0118874 A1    May 7, 2009

(51) Int. Cl.
B64C 13/38    (2006.01)
(52) U.S. Cl. ........................................ 701/300; 318/432
(58) Field of Classification Search .................. 701/300; 318/432, 434, 471, 472; 454/72; 244/81, 244/183, 111, 187, 110 R, 50
See application file for complete search history.

(56) References Cited

U.S. PATENT DOCUMENTS

| | | | |
|---|---|---|---|
| 2,953,325 A * | 9/1960 | Hadekel | ........................ 244/76 R |
| 3,057,170 A | 10/1962 | Brahm | |
| 3,057,583 A * | 10/1962 | Majendie et al. | ............. 244/181 |
| 3,437,173 A | 4/1969 | Ehrich | |
| 3,764,815 A | 10/1973 | Habock et al. | |
| 4,091,613 A | 5/1978 | Young | |
| 4,370,560 A | 1/1983 | Faulkner et al. | |
| 4,419,926 A | 12/1983 | Cronin et al. | |
| 4,434,624 A | 3/1984 | Cronin et al. | |
| 4,456,830 A | 6/1984 | Cronin et al. | |
| 4,462,561 A | 7/1984 | Cronin | |
| 4,494,372 A | 1/1985 | Cronin | |
| 4,514,976 A | 5/1985 | Christoff | |
| 4,523,517 A | 6/1985 | Cronin | |
| 4,533,097 A | 8/1985 | Aldrich | |
| 4,546,939 A | 10/1985 | Cronin | |
| 4,684,081 A | 8/1987 | Cronin | |
| 5,074,495 A | 12/1991 | Raymond | |
| 5,152,141 A | 10/1992 | Rumford et al. | |
| 5,627,744 A * | 5/1997 | Baker et al. | ................... 363/165 |
| 5,734,239 A | 3/1998 | Turner | |
| 5,865,602 A | 2/1999 | Nozari | |
| 6,344,700 B1 | 2/2002 | Eisenhauer et al. | |

(Continued)

FOREIGN PATENT DOCUMENTS
EP        1640673 A2    3/2006
(Continued)

OTHER PUBLICATIONS

"All-Electric Aircraft, vol. I and vol. II," presented at IEEE/AESS Symposium, Dayton, Ohio, Nov. 30, 1983, 90 pages.

(Continued)

*Primary Examiner* — Dalena Tran
(74) *Attorney, Agent, or Firm* — Perkins Coie LLP (57) ABSTRACT

Systems and methods for controlling aircraft electrical power are disclosed. A system in accordance with one embodiment includes an electric motor, an aircraft load coupled to the electric motor and powered by the electric motor, and a motor controller coupled to the electric motor to vary an output of the electric motor. The motor controller is changeable among a fixed number of preset controller modes, with individual controller modes corresponding to an operation mode of the aircraft and a non-zero output level of the electric motor. In further embodiments, motor controllers can be substituted for each other, e.g., in the event one motor controller becomes unoperational.

26 Claims, 5 Drawing Sheets

U.S. PATENT DOCUMENTS

| | | | |
|---|---|---|---|
| 6,467,725 | B1 | 10/2002 | Coles et al. |
| 6,554,229 | B1 * | 4/2003 | Lam et al. .................... 244/217 |
| 6,575,405 | B2 * | 6/2003 | Bryant et al. ........... 244/102 SL |
| 6,684,636 | B2 | 2/2004 | Smith |
| 6,777,822 | B1 | 8/2004 | Suttie et al. |
| 6,953,100 | B2 | 10/2005 | Aberle et al. |
| 7,207,521 | B2 | 4/2007 | Atkey |
| 7,210,653 | B2 | 5/2007 | Atkey et al. |
| 7,334,422 | B2 | 2/2008 | Zywiak et al. |
| 7,364,116 | B2 | 4/2008 | Nguyen et al. |
| 7,400,065 | B2 | 7/2008 | Michalko et al. |
| 7,406,370 | B2 | 7/2008 | Kojori et al. |
| 7,922,117 | B2 | 4/2011 | Wavering et al. |
| 2004/0129835 | A1 | 7/2004 | Atkey et al. |
| 2006/0042846 | A1 | 3/2006 | Kojori et al. |
| 2006/0061213 | A1 | 3/2006 | Michalko |
| 2006/0102790 | A1 | 5/2006 | Atkey et al. |
| 2007/0267540 | A1 | 11/2007 | Atkey et al. |
| 2007/0284480 | A1 | 12/2007 | Atkey et al. |

FOREIGN PATENT DOCUMENTS

| | | |
|---|---|---|
| WO | WO-0147100 A1 | 6/2001 |
| WO | WO-02066323 A2 | 8/2002 |

OTHER PUBLICATIONS

Chang M. et al., Preliminary (Issue #1) Power-by-Wire Development and Demonstration Electrical Power Center Module Requirements and Specifications; McDonnell Douglas Aerospace Transport Aircraft; Nov. 1994, 102 pages.

Chang M. et al., Preliminary (Issue #3) Power-by-Wire Development and Demonstration—Power Management and Distribution Requirements and Specifications;McDonnell Douglas Aerospace Transport Aircraft; Jun. 1995, 138 pages.

IEEE 1983 National Aerospace and Electronics Conference, NAECON 1983, pp. 10 pages.

Williams, Kenneth R., "Integrated Power Systems for Future Transport Aircraft,"0 Transport Aircraft Division; McDonnell Douglas Aerospace; Jan. 3, 1997; 8 pages.

Cronin, Michael J., "The All-Electric Airplane as an Energy Efficient Transport," SAE Technical Paper Series 801131, Aerospace Congress & Exposition, Los Angeles Convention Center, Oct. 13-16, 1980.

Emadi et al. "Electrical System Architectures for Future Aircraft," SAE Technical Paper Series 1999-01-2645, Texas A&M University, 34th Intersociety Energy Conversion, Engineering Confrence, Vancouver, British Columbia, Aug. 2-5, 1999, 7 pages.

Wild, Thomas W., "Transport Category Aircraft Systems," Jeppesen, 3rd Edition, date unknown.

Glennon, "Fault Tolerant Generating and Distribution System Architechture," IEEE Colloccquium on All Electric Aircraft, 1998, 5 pages.

Andrade et al., "Design of the Boeing 777 Electric System," NAECON, 1992, 10 pages.

Extended Search Report for European Patent Application No. 07075515.2, Applicant:The Boeing Company, mailed Jan. 17, 2012, 4 pages.

* cited by examiner

SYSTEMS AND METHODS FOR CONTROLLING AIRCRAFT ELECTRICAL POWER

TECHNICAL FIELD

The present disclosure is directed generally to systems and methods for controlling aircraft electrical power, including controlling the operation of motor controllers in a manner that depends upon the operational mode of the aircraft, and/or substituting one motor controller for another.

BACKGROUND

Aircraft manufacturers are under continual pressure to reduce the power required by commercial transport aircraft, and to improve the efficiency with which such aircraft are operated. One approach for achieving these goals has been to replace devices that historically have been driven by bleed air or shaft output from the aircraft engines, with devices that are electrically driven. For example, hydraulic pumps on newer generation aircraft are now driven by electric motors. Hydraulic pumps pressurize hydraulic fluid which is in turn used to power many aircraft systems, including landing gear, high lift devices (e.g., leading edge devices and trailing edge devices), ailerons, elevators, rudders, and/or other devices that are important for aircraft operation. Electrically-driven hydraulic pumps are expected to provide an improved measure of efficiency, flexibility, and/or reliability.

As a result of the migration to electrically-driven hydraulic pumps, the need for large electric pumps and associated electric motors and motor controllers has increased. Because the hydraulic pumps are sized to operate at conditions that the aircraft rarely encounters during normal flight, the pumps are generally operated below maximum output levels. The output of the pumps can be reduced by decreasing the speed of the pump during most flight conditions, and increasing the pump speed as demand for hydraulic pressure increases.

One drawback with the foregoing approach is that the electrically-driven pumps tend to cycle repeatedly between high and low output settings as the demand for hydraulic fluid pressure fluctuates. This can create a whining noise. Because the hydraulic pumps may be located directly beneath the passenger cabin, the whining noise can be audible and annoying to the passengers. Accordingly, there is a need to reduce the level of noise experienced by the passengers, while operating the hydraulic pumps in an efficient manner.

SUMMARY

The following summary is provided for the benefit of the reader only, and is not intended to limit in any way the invention as set forth by the claims. Aspects of the present disclosure are directed to systems and methods for controlling aircraft electrical power. An aircraft power system in accordance with one aspect includes an electric motor, an aircraft load (e.g., a hydraulic pump) coupled to the electric motor and powered by the electric motor, and a motor controller coupled to the electric motor to vary the output of the electric motor. The motor controller can be changeable among a fixed number of preset controller modes, with individual controller modes corresponding to an operation mode of the aircraft and to a non-zero output level of the electric motor. The fixed number of preset controller modes can reduce the tendency for frequent fluctuations in the power put out by the electric motor.

In particular aspects, the motor controller can be changeable among five controller modes. A first controller mode can correspond to ground operations, a second controller mode can correspond to cruise operations, and a third controller mode can correspond to takeoff and descent operations. A fourth controller mode can correspond to thrust reverser operations, and a fifth controller mode can correspond to automatic flap gapping operations.

An aircraft power generation system in accordance with another aspect includes a first electric motor, a first device (including an on-board aircraft hydraulic pump) coupled to and powered by the first electric motor, and a first motor controller coupled to the first electric motor to direct its operation. The system can further include a second electric motor, a second device coupled to and powered by the second electric motor, and a second motor controller coupled to the second electric motor to direct its operation. A switching device can be coupled between the first and second motor controllers to decouple the first motor controller from the first motor, decouple the second motor controller from the second motor, and couple the second motor controller to the first motor in place of the first motor controller. Accordingly, the second motor controller can substitute for the first and can provide for system redundancy.

Certain aspects are also directed to methods for controlling an aircraft system. One method includes receiving an indication of an operation mode of the aircraft, automatically selecting a generally constant output level from among a fixed number of multiple, preset output levels, based at least in part on the operation mode, and directing an electric motor to produce the selected output level. In particular aspects, the electric motor can be directed to operate at a fixed speed as a load on the motor changes. In still a further particular aspect, the electric motor is coupled to a hydraulic pump and the method further comprises driving the pump while an audible noise output of the pump is at an approximately constant level, with the electric motor producing the selected output level. In still further particular aspects, the electric motor can be coupled to a hydraulic pump, and the indication of the operation mode of the aircraft can correspond to a change in deployment of a high lift device, a change in a setting of an engine throttle, an altitude indication, and/or an indication from a weight-on-wheels indicator that the aircraft has landed.

A method in accordance with still another aspect includes receiving an indication corresponding to an expected increase in load on an aircraft electric motor from a current load level to a subsequent load level. The method can further include automatically changing an output of the electric motor in response to the indication and prior to the load level changing from the current load level to the subsequent load level. For example, the output of the electric motor can change in response to an indication that a throttle setting of the aircraft is advanced to at least 90% of maximum thrust. In another aspect, the output of the electric motor can change in response to an indication of a change in a high lift device setting (e.g., a change to or from a deployed setting or a stowed setting).

DETAILED DESCRIPTION

The present disclosure describes systems and methods for controlling aircraft electrical power. Certain specific details are set forth in the following description and in FIGS. 1-5 to provide a thorough understanding of various embodiments of the invention. Well-known structures, systems, and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Several embodiments of the invention described below may take the form of computer-executable instructions, including routines executed by a programmable computer. Those skilled in the relevant art will appreciate that the invention can be practiced on computer or analog systems other than those shown and described below. The invention can be embodied in a special-purpose computer or data processor that is specifically programmed, configured or constructed to perform one or more of the computer-executable instructions described below. Accordingly, the term "computer" as generally used herein refers to any suitable data processor, including processors used for existing aircraft, programmed to carry out some or all of the instructions described below.

Figure 1:
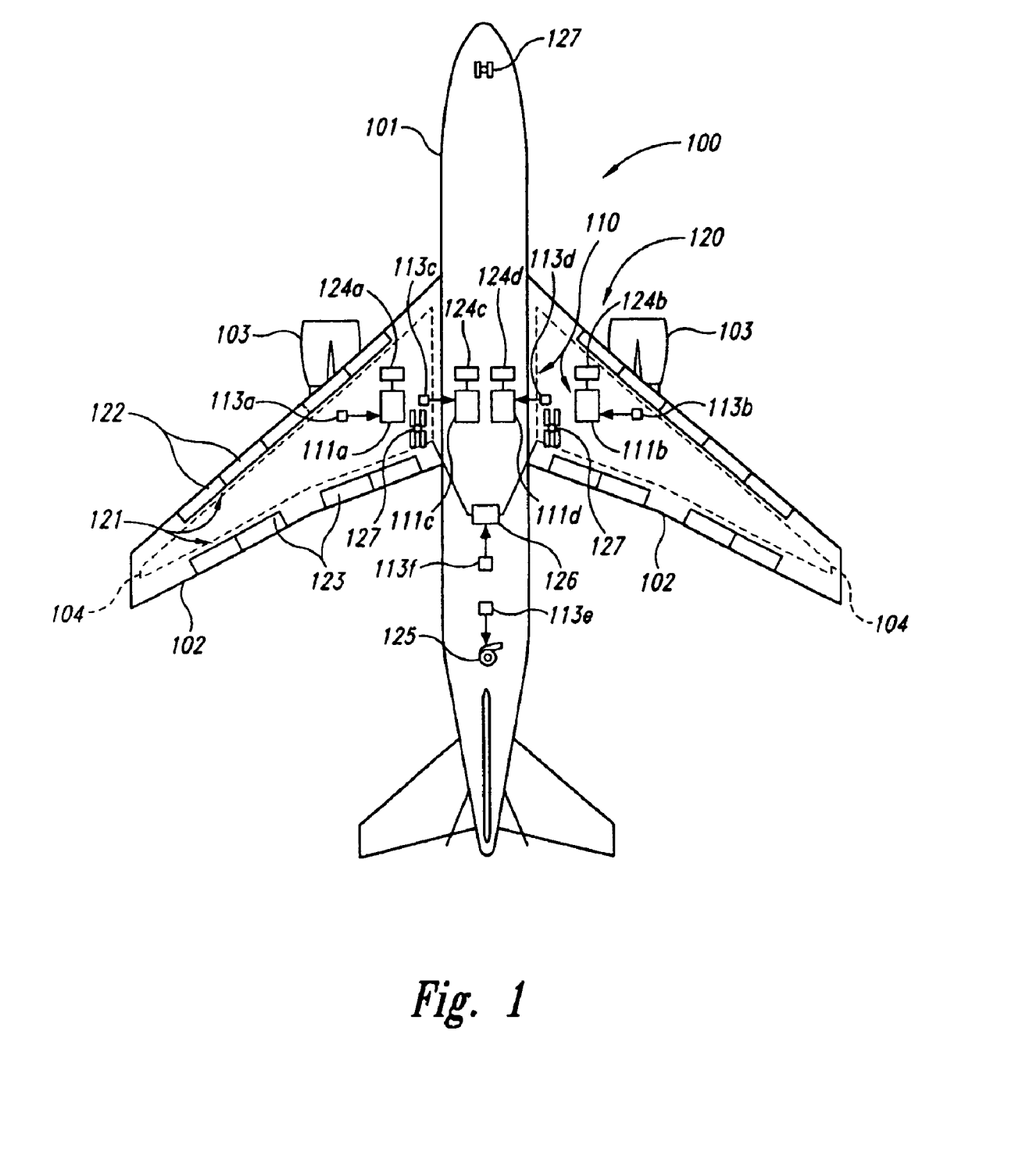
FIG. 1 is a schematic top plan view of an aircraft having power systems configured in accordance with an embodiment of the invention.

FIG. 1 is a schematic illustration of an aircraft 100 carrying one or more power systems 110 configured in accordance with an embodiment of the invention. The aircraft 100 includes a fuselage 101, wings 102, and one or more engines 103 that provide power to propel the aircraft 100 and drive various aircraft subsystems or loads 120. These subsystems can include high lift devices 121 (e.g., leading edge devices 122 and/or trailing edge devices 123) located on the wings 102 of the aircraft, and landing gear 127 carried by the wings 102 and/or the fuselage 101. These devices can be hydraulically powered by one or more hydraulic pumps 124 (four are shown in FIG. 1 as hydraulic pumps 124a-124d). Each hydraulic pump 124 can be driven by a corresponding electric motor 111 (four are shown as electric motors 111a-111d), and each motor 111 can be controlled by a corresponding motor controller 113 (four are shown as motor controllers 113a-113d).

The aircraft 100 also carries other electrically-driven devices, for example, an environmental control system (ECS) compressor 125 that provides pressurized air to the passenger, crew, and baggage compartments. Additional electrically-driven devices can include a nitrogen generation system 126 that extracts nitrogen from the ambient air and provides it to fuel tanks 104 to create an inerting environment in which the likelihood for a fuel explosion is significantly decreased. Each of these devices can include a motor and an associated motor controller 113 (shown as motor controllers 113e and 113f, respectively). As is described in greater detail below with reference to FIGS. 2-3, the motor controllers 113 can be configured to operate at a fixed number of preset controller modes to reduce the frequency with which the motor speed or other output parameter changes during the course of a typical aircraft flight. As is discussed in greater detail below with reference to FIGS. 4 and 5, the motor controllers can be configured to substitute for each other, for example, to provide a level of redundancy for the functions carried out by the devices driven by the corresponding motors.

Figure 2:
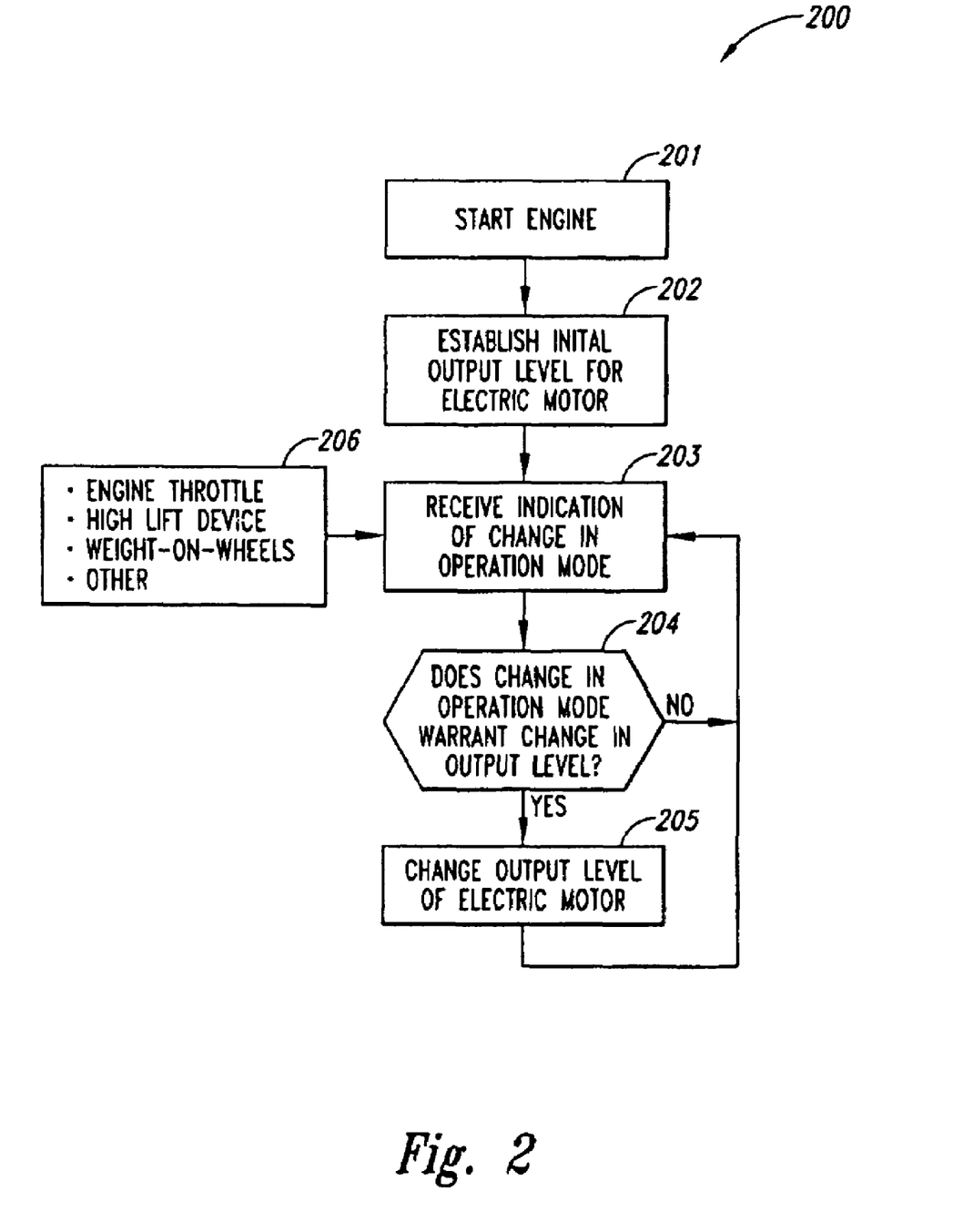
FIG. 2 is a flow diagram illustrating a process in accordance with an embodiment of the invention for changing an output level of an electric motor in response to a change in an operation mode of the aircraft.

FIG. 2 is a flow diagram illustrating a representative process 200 for operating an aircraft power system in accordance with an embodiment of the invention. The process 200 includes starting the aircraft engine(s) (process portion 201), and establishing an initial output level for an electric motor coupled to the engine or engines (process portion 202). The initial output level can correspond to a motor speed, power level, torque, or any other suitable measure. The output of the motor can be controlled by controlling a suitable input, e.g., input current and/or voltage level, signal frequency and/or other inputs. Process portion 203 includes receiving an indication of a change in an operation mode of the aircraft. A representative list of indications is shown at block 206. For example, one indication can include a change in engine throttle setting. Another indication can include a change in the setting of a high lift device (e.g., deploying the device or stowing the device). Still another indication can include an indication that the aircraft has landed, for example, a signal transmitted by a weight-on-wheels sensor. In other embodiments, the indication can include other parameters, for example, a gear up indication or an altitude indication.

In an optional process portion 204, the process 200 includes determining whether a change in the operation mode warrants a change in motor output level. For example, not every change in an operation mode need necessarily result in a change in motor output level. In a particular example, the change in motor output level is warranted if the change in operation mode is expected to produce either an upward or a downward change in the demand placed on the motor, assuming the change meets or exceeds a threshold level. If the change is warranted, the output level of the motor is changed in process portion 205. If not, the process 200 returns to process portion 203 to await an indication of a change in operation mode. The foregoing process steps can be repeated until the engine is shut down.

Figure 3:
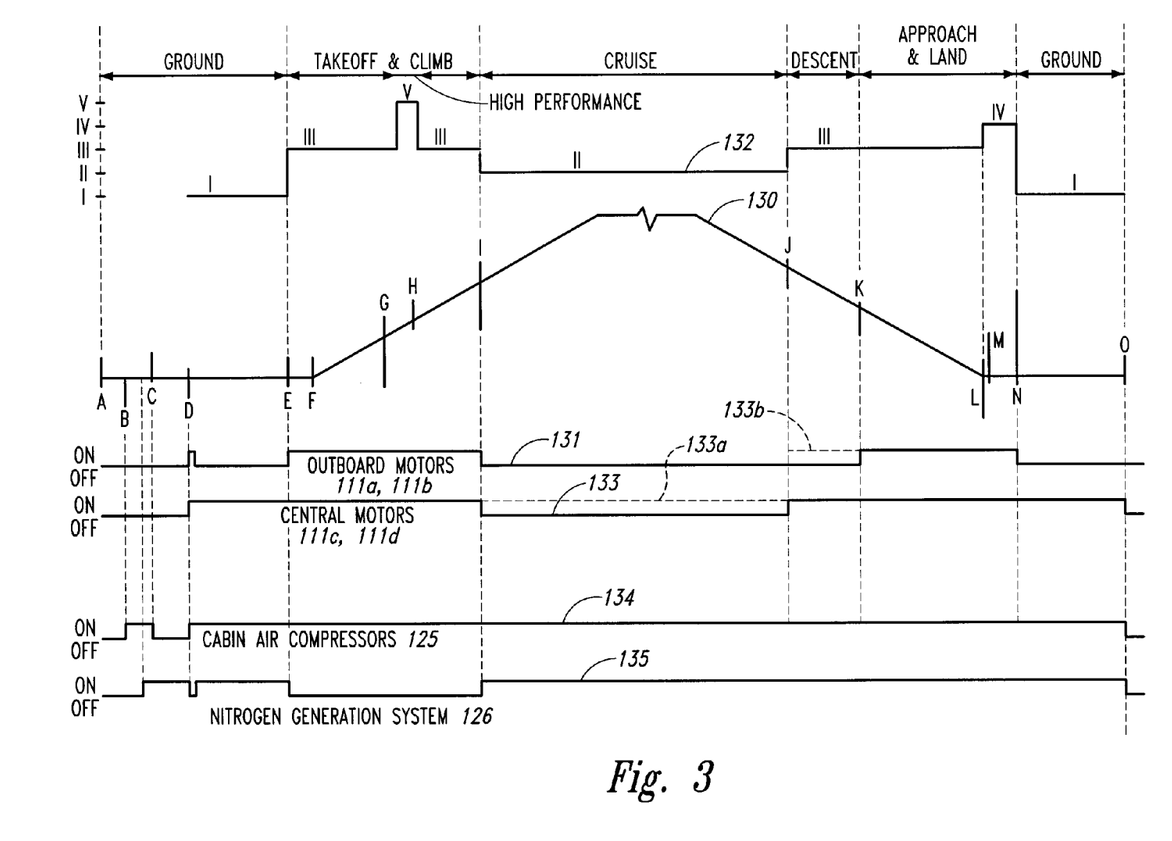
FIG. 3 is a schematic illustration of changes in motor output level as a function of changes in aircraft operation modes.

FIG. 3 is a schematic illustration of an operating profile 130 for an aircraft during a typical flight. The operation of the aircraft includes a variety of operation modes, a representative number of which are indicated along the horizontal axis at the top of FIG. 3. These modes can include a ground mode, followed by a takeoff and climb mode, a cruise mode, and an approach and land mode, followed by another ground mode. Though not representative of a typical flight, a high performance mode is also shown in FIG. 3 for purposes of illustration. In other embodiments, the system can include other modes, for example, additional ground modes or sub-modes for testing and/or maintenance.

A motor controller mode line 132 is also shown in FIG. 3. In this representative example, the motor controller mode for one or more motors that provide hydraulic power to the aircraft is selected from among five different modes, represented by numerals I-V. Each motor controller mode corresponds to an aircraft operation mode and to a motor output level, with mode I corresponding to the lowest or the selected five output levels, and mode V corresponding to the highest. Further details of the controller modes and manners in which the modes are changed are described below.

FIG. 3 also illustrates motor activation lines, including hydraulic motor activation lines 131, 133, and non-hydraulic motor activation lines 134 and 135. An outboard hydraulic motor activation line 131 corresponds to the operation of the first and second (e.g., left and right) motors 111a, 111b shown in FIG. 1. A center hydraulic motor activation line 133 illustrates the operation of the third and fourth centrally located motors 111c, 111d shown in FIG. 1. The non-hydraulic motor activation lines 134, 135 illustrate the operation of the ECS compressor 125 (FIG. 1) and the nitrogen generation system 126 (FIG. 1), respectively.

The operations of the motors and associated motor controllers during a representative flight are now described with reference to FIG. 3. As shown by the operating profile 130, ground operations typically begin with the start of the aircraft auxiliary power unit (indicated by tick mark A on the operation profile 130), followed by activation of the ECS compressor (tick mark B) and then by the start of the aircraft main engines (tick mark C). At tick mark D, the electric motor driven hydraulic pumps are started, corresponding to a motor output level I, as indicated by the motor output level line 132. The motor output can remain at level I during taxi maneuvers and engine run-up in preparation for takeoff (tick mark E).

Initiating engine run-up can provide a trigger for changing the output of the electric motor driving the hydraulic pump from level I to another level, for example, level III, as shown in FIG. 3. The trigger can be identified by a change in the aircraft throttle setting, for example, when the aircraft throttle setting exceeds 90% of maximum thrust. In other embodiments, other triggers can be used to identify a change in the operation mode and trigger a corresponding change in the controller mode and motor output level.

One feature of an embodiment of the triggering event, for example, the engine run-up triggering event described above, is that it triggers an increase in motor output prior to an increase in the load on the motor that would require such an increase in output. For example, increasing the throttle setting on the engine, by itself, may not require additional output by the hydraulic motor pumps, but the subsequent loads placed on the aircraft as it leaves the ground typically will. Accordingly, in one aspect of the invention, the motor controller changes modes automatically in response to a trigger, prior to a change in demand on the device that is driven by the electric motor.

The motor controller mode can remain at mode III during takeoff (tick mark F), and gear retraction (tick mark G). If a high performance event occurs (e.g., if the aircraft approaches stall and requires an automatic flap gapping operation), then the motor mode can shift to mode V, as indicated at tick mark H, and the associated motor output can increase accordingly. This is typically a short duration segment, after which the motor controller mode returns to mode III. Because the high performance requirement is typically not predicted, in this instance, the change from one controller mode to another may not precede or anticipate a change in load on the motor, as was the case for the take-off operation described above.

At tick mark I, the flaps, slats and/or other high lift devices are fully retracted, indicating a gradual transition to cruise conditions. The retraction of the high lift devices can trigger a change in controller mode to mode II, which can remain in effect throughout the cruise mode and during the initial descent. At tick mark J, the high lift devices are deployed, and the controller mode returns to mode III. The gear can be deployed at tick mark K, without an effect on the controller mode. At tick mark L, the aircraft touches down, and this can provide an automatic trigger for the controller mode to change to mode IV, in anticipation of the thrust reversers being deployed (tick mark M). The change in controller mode can be automatically triggered by a signal received from a weight-on-wheels sensor, or other signal corresponding to aircraft touchdown. The touchdown itself is not expected to create an increased demand on the hydraulic pump motor, but instead precedes the expected deployment of the thrust reversers. At tick mark N, the thrust reversers are stowed, and the controller mode returns to mode I for the remainder of ground operations until the engine is shut down (tick mark O).

One feature of embodiments described above with reference to FIGS. 1-3 is that the motor controller and the motor which it directs change among several preset modes. Each mode is selected to correspond to a motor output that provides sufficient power for the associated aircraft operation mode, and can include a margin for load fluctuations. As shown in FIG. 3, changes in motor and motor controller mode correspond to changes in aircraft operation mode and are limited during a typical flight. In a representative example shown in FIG. 3, the hydraulic motors change mode six times during the course of a normal flight, eight times if a high performance mode is required. This is unlike some existing motor arrangements, in which the motor and associated hydraulic pump can cycle repeatedly back and forth between output levels. Alternatively, other existing arrangements include operating the hydraulic pump continuously at a high output level, which can waste energy. An advantage of embodiments of the arrangement described above is that reducing the number of instances in which the hydraulic pump changes output (e.g., pump speed) reduces the likelihood for "whining" or other annoying noise to be transmitted to the passenger cabin. As a result, the foregoing arrangement is expected to increase passenger comfort.

Another aspect of at least some of the embodiments described above is that the change in controller mode, and therefore motor and pump output, can automatically precede a change in demand on the hydraulic system. For example, as discussed above, the hydraulic pump available power can increase prior to takeoff in anticipation of increased loads experienced during takeoff, and can increase after touchdown in anticipation of higher loads required during thrust reverser deployment. An advantage of this arrangement is that it allows the motor and pump time to increase output prior to an increased load being placed on the system, which in turn results in the increased load demands being met more quickly.

One aspect of an embodiment shown in FIG. 3 is that the controller mode for each of the four motors coupled to the hydraulic system can be the same. For example, during takeoff and climb, all four motor controllers 111a-111d are at mode III. In other embodiments, different motor controllers can have different modes at the same time. This arrangement can allow for additional flexibility in establishing hydraulic pump output.

As is also shown in FIG. 3, not all the hydraulic pumps need be active at the same time. For example, during mode I, only the centrally-located motors 111c-111d need be active, and the outboard motors 111a-111b can be shut down. During mode II, only one of the centrally-located motors 111c-111d need be operational, as indicated by dashed line 133a. During descent, both the centrally-located motors 111c-111d can be active, and optionally, only one of the outboard motors 111a-111b can also be activated (indicated by dashed line 133b), and then joined by the other outboard motor during approach and landing.

Figure 4:
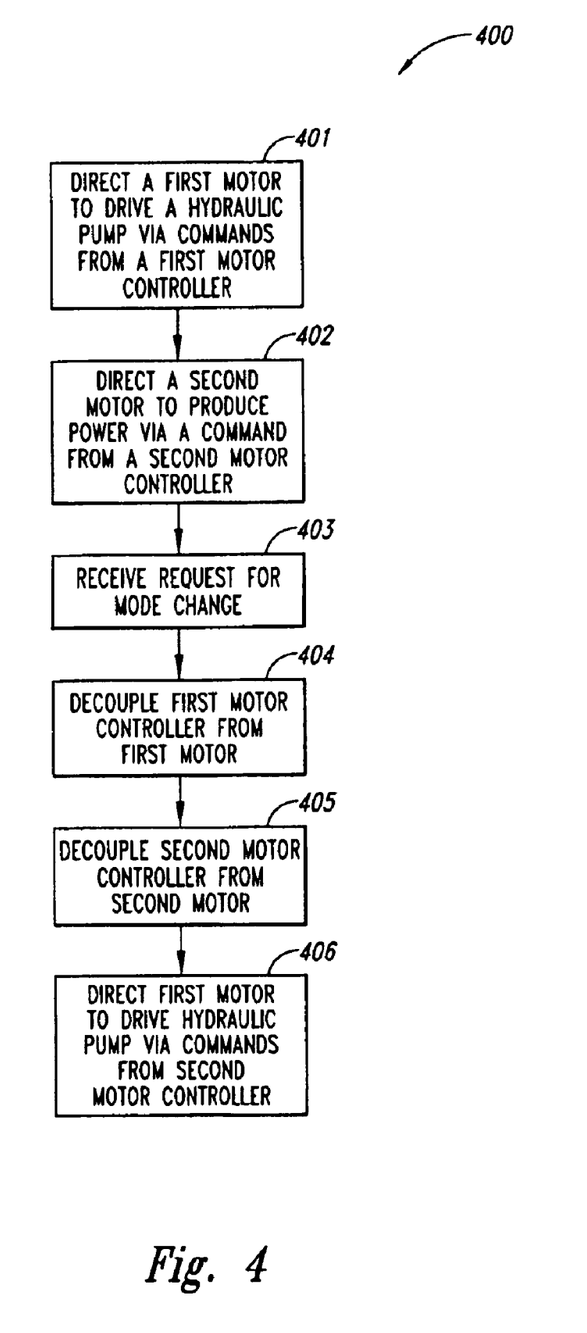
FIG. 4 is a flow diagram illustrating a method for substituting one motor controller for another in accordance with an embodiment of the invention.

In other embodiments, motor controllers associated with non-hydraulic loads can substitute for failed or otherwise inactive motor controllers that normally direct the operation of motors coupled to hydraulic pumps, to provide a measure of redundancy for the hydraulic system. For example, FIG. 4 illustrates a process 400 that includes directing a first motor to drive a hydraulic pump via commands from a first motor controller (process portion 401) and directing a second motor to produce power via a command from a second motor controller (process portion 402). The second motor can provide power to a non-hydraulic system, for example, an ECS compressor or nitrogen generation system. Process portions 401 and 402 correspond to a first mode of operation. In process portion 403, a request is received for a change in this mode, which, in this case, can be independent of the overall operation mode of the aircraft described above with reference to FIG. 3. For example, the request for a mode change can correspond to an indication that the first motor controller has failed. In response to this request, the first motor controller can be decoupled from the first motor (process portion 404) and the second motor controller can be decoupled from the second motor (process portion 405). In process portion 406, the first motor is directed to drive the hydraulic pump via commands from the second motor controller. Accordingly, the second motor controller is substituted for the first motor controller.

Figure 5:
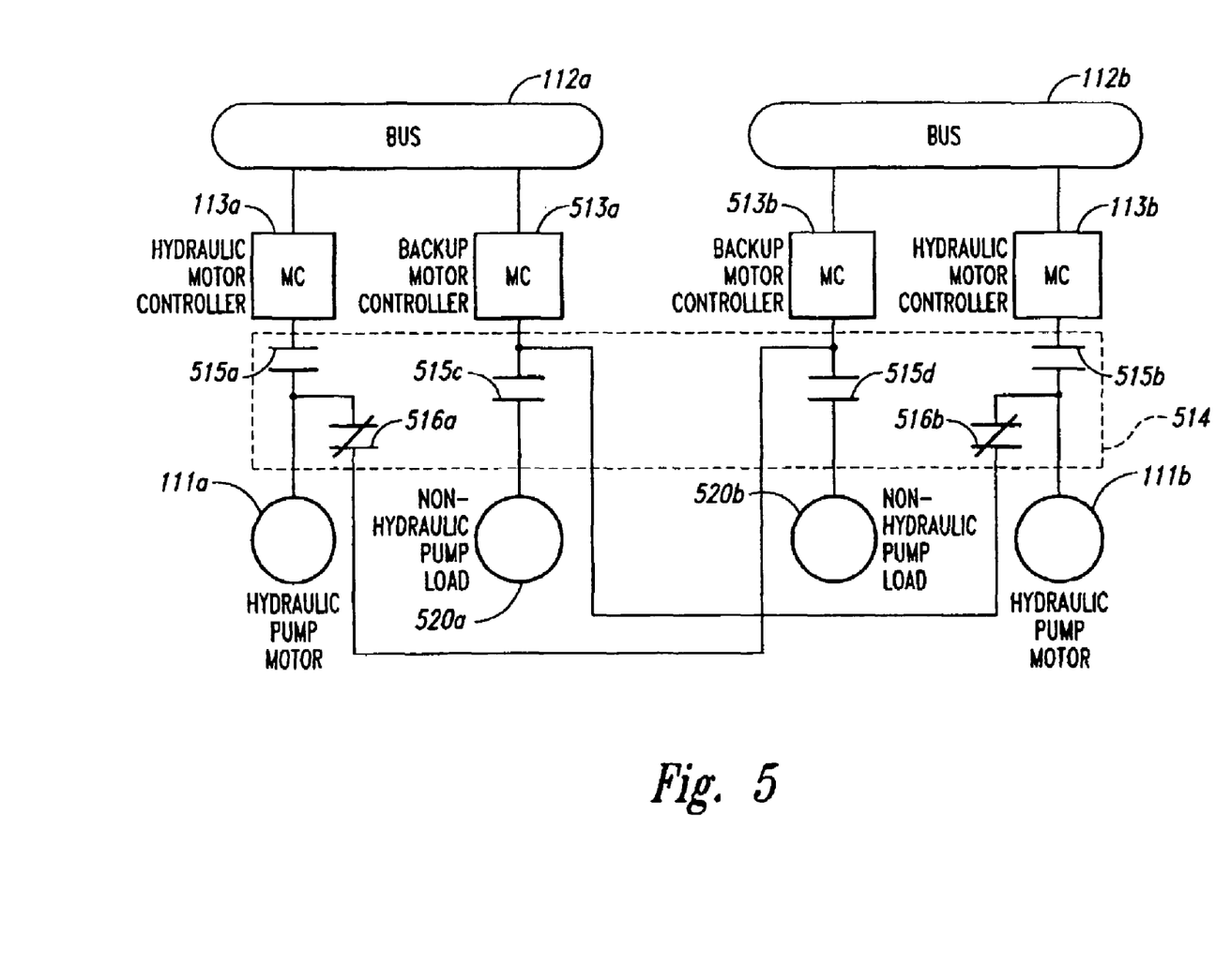
FIG. 5 is a schematic illustration of an arrangement for substituting one aircraft motor controller for another in accordance with another embodiment of the invention.

FIG. 5 is a schematic illustration of a system for substituting a motor controller associated with a non-hydraulic load for a failed or otherwise inactive motor controller associated with a hydraulic pump. The system can include one or more buses 112 (shown as a first bus 112a and a second bus 112b), each of which provides power to a corresponding first hydraulic motor controller 113a and a second hydraulic motor controller 113b. The first bus 112a also provides power to a backup or non-hydraulic motor controller 513a and the second bus 112b provides power to a corresponding second backup or non-hydraulic motor controller 513b. During normal operations, the first hydraulic motor controller 113a controls a first hydraulic pump motor 111a, the second hydraulic motor controller 113b controls a second hydraulic pump motor 111b, the first backup motor controller 513a powers a first non-hydraulic load 520a, and the second backup motor controller 513b controls a second hydraulic load 520b. A switch device 514 is coupled between the motor controllers and the loads to selectively couple motor controllers with the appropriate loads. Accordingly, the switch device 514 can include first and second primary switches 515a, 515b that are normally closed to couple the corresponding hydraulic motor controllers with the corresponding hydraulic pumps. Third and fourth primary switches 515c, 515d are also normally closed to provide a connection between the backup motor controllers 513a, 513b and the corresponding non-hydraulic loads 520a, 520b. If either of the hydraulic motor controllers 113a, 113b fail or are otherwise deactivated, then the corresponding primary switch 515a, 515b is opened, as shown in FIG. 5, and corresponding backup switch 516a, 516b is closed, as is also shown in FIG. 5. Accordingly, the second backup motor controller 513b controls the first hydraulic pump motor 111a, and/or the first backup motor controller 513a controls the second hydraulic pump motor 111b.

One advantage of embodiments of systems having the features described above with reference to FIGS. 4 and 5 is that the backup or non-hydraulic motor controllers can substitute for the hydraulic motor controllers in the event of a failure in the hydraulic motor controllers. Accordingly, the backup motor controllers can decouple from a less important load and provide power to a more important load in the event that such power is needed. The backup motor controllers can accordingly be of the same size and/or capability as the hydraulic motor controllers, or can have a size and/or capability that is larger than that of the hydraulic motor controllers in order to support this substitution.

From the foregoing, it will be appreciated that specific embodiments of the invention have been described herein for purposes of illustration, but that various modifications may be made without deviating from the invention. For example, the motor controllers may have more or fewer than the number of fixed modes described in certain embodiments above. The modes may correspond to different flight regimes than those discussed above. Certain embodiments were described in the context of particular systems (e.g., hydraulic pump motors, ECS systems, and nitrogen generation systems), but may be applied to other systems and/or combinations of systems in other embodiments. Aspects of the invention described in the context of particular embodiments may be combined or eliminated in other embodiments. For example, aspects of the backup motor controller functions may be provided in combination with motor controllers operating with a fixed number of predetermined modes. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft power system, comprising:
a first electric motor;
an aircraft load coupled to the first electric motor and powered by the first electric motor, the load including a hydraulic fluid pump;
a high lift device coupled to the hydraulic fluid pump;
a first motor controller coupled to the first electric motor to vary an output of the first electric motor, the first motor controller being changeable among a fixed number of preset controller modes, with a first controller mode corresponding to a first operation mode of the aircraft and a first non-zero output level of the first electric motor, and a second controller mode corresponding to a second operation mode of the aircraft and a second non-zero output level of the first electric motor, the second operation mode being different than the first operation mode, the second non-zero output level being different than the first non-zero output level, the first motor controller being operatively coupled to the high lift device to change the controller mode based at least in part on a change in position of the high lift device;
a second electric motor;
a second motor controller coupled to the second electric motor to direct operation of the second electric motor; and
a switching device coupled between the first and second motor controllers to decouple the first motor controller from the first motor, decouple the second motor controller from the second motor, and couple the second motor controller to the first motor in place of the first motor controller.

2. The system of claim 1, further comprising an engine throttle, and wherein the first motor controller is operatively coupled to the engine throttle to change the controller mode based at least in part on a change in a setting of the engine throttle.

3. The system of claim 1, further comprising a weight-on-wheels indicator, and wherein the first motor controller is operatively coupled to the weight-on-wheels indicator to change the controller mode based at least in part on an indication from the weight-on-wheels indicator.

4. The system of claim 1 wherein the output of the first electric motor includes a speed of the first electric motor.

5. The system of claim 4 wherein individual preset controller modes correspond to different frequencies with which electrical power is provided to the first electric motor.

6. The system of claim 1 wherein the first motor controller is changeable among five controller modes, and wherein the first controller mode corresponds to ground operations, the second controller mode corresponds cruise operations, a third controller mode corresponds to takeoff and decent operations, a fourth controller mode corresponds to a thrust reverser operations, and a fifth controller mode corresponds to automatic flap gapping operations.

7. The system of claim 1 wherein the first motor controller is coupled to a signal input device that provides input signals corresponding to the operation modes of the aircraft, and wherein the first motor controller automatically changes from one controller mode to another based at least in part of the input signals.

8. The system of claim 1, further comprising a computer readable medium having instructions for directing the output of the first electric motor.

9. The system of claim 1, further comprising:
a fuselage;
a wing; and
a propulsion system, wherein the first electric motor, the aircraft load and the first motor controller are carried by at least one of the wing and the fuselage, and wherein the first electric motor is coupled to the propulsion system to receive power from the propulsion system.

10. The system of claim 1, further comprising:
a fuselage;
a wing; and
a propulsion system; and wherein
the first electric motor, the aircraft load and the first motor controller are carried by at least one of the wing and the fuselage;
the hydraulic pump is coupled to hydraulic actuators carried by at the least one of the wing and the fuselage;
the first electric motor is coupled to the propulsion system; and
the first motor controller is changeable among five controller modes including the first controller mode which corresponds to ground operations, the second controller mode which corresponds to cruise operations, a third controller mode corresponding to takeoff and decent operations, a fourth controller mode corresponding to thrust reverser operations, and a fifth mode corresponding to automatic flap gapping operations.

11. The system of claim 1 wherein the switching device includes a computer-readable medium having instructions for automatically switching the first and second motor controllers.

12. The system of claim 1, further comprising an aircraft environmental control system compressor powered by the second electric motor.

13. The system of claim 1 wherein the first and second motors have at least approximately the same output power.

14. The system of claim 1 wherein the second motor has a higher output power capability than the first motor.

15. An aircraft power system, comprising:
a first electric motor;
an aircraft load coupled to the first electric motor and powered by the first electric motor, the load including a hydraulic pump;
a first motor controller coupled to the electric motor to vary an output of the first electric motor, the first motor controller being changeable among a fixed number of preset controller modes, with individual controller modes corresponding to an operation mode of the aircraft and a non-zero output level of the first electric motor;
a weight-on-wheels indicator, wherein the first motor controller is operatively coupled to the weight-on-wheels indicator to change the controller mode based at least in part on an indication from the weight-on-wheels indicator;
a second electric motor;
a second motor controller coupled to the second electric motor to direct operation of the second electric motor; and
a switching device coupled between the first and second motor controllers to decouple the first motor controller from the first motor, decouple the second motor controller from the second motor, and couple the second motor controller to the first motor in place of the first motor controller.

16. The system of claim 15 wherein the output of the first electric motor includes a speed of the electric motor.

17. The system of claim 16 wherein individual preset controller modes correspond to a different frequencies with which electrical power is provided to the first electric motor.

18. The system of claim 15 wherein the first motor controller is changeable among five controller modes, and wherein the first controller mode corresponds to ground operations, the second controller mode corresponds cruise operations, a third controller mode corresponds to takeoff and decent operations, a fourth controller mode corresponds to a thrust reverser operations, and a fifth controller mode corresponds to automatic flap gapping operations.

19. The system of claim 15 wherein the first motor controller is coupled to a signal input device that provides input signals corresponding to the operation modes of the aircraft, and wherein the first motor controller automatically changes from one controller mode to another based at least in part of the input signals.

20. The system of claim 15, further comprising a computer readable medium having instructions for directing the output of the first electric motor.

21. The system of claim 15, further comprising:
a fuselage;
a wing; and
a propulsion system, wherein the first electric motor, the aircraft load and the first motor controller are carried by at least one of the wing and the fuselage, and wherein the first electric motor is coupled to the propulsion system to receive power from the propulsion system.

22. The system of claim 15, further comprising:
a fuselage;
a wing; and
a propulsion system; and wherein
the first electric motor, the aircraft load and the first motor controller are carried by at least one of the wing and the fuselage;
the hydraulic pump is coupled to hydraulic actuators carried by at the least one of the wing and the fuselage;
the first electric motor is coupled to the propulsion system; and
the first motor controller is changeable among five controller modes including the first controller mode which corresponds to ground operations, the second controller mode which corresponds to cruise operations, a third controller mode corresponding to takeoff and decent operations, a fourth controller mode corresponding to thrust reverser operations, and a fifth mode corresponding to automatic flap gapping operations.

23. The system of claim 15 wherein the switching device includes a computer-readable medium having instructions for automatically switching the first and second motor controllers.

24. The system of claim 15, further comprising an aircraft environmental control system compressor powered by the electric motor.

25. The system of claim 15 wherein the first and second motors have at least approximately the same output power.

26. The system of claim 15 wherein the second motor has a higher output power capability than the first motor.

* * * * *